United States Patent
Sekimoto et al.

(10) Patent No.: US 7,408,139 B2
(45) Date of Patent: Aug. 5, 2008

(54) VIDEO IMAGE CAPTURE DEVICE

(75) Inventors: Tomomi Sekimoto, Tokyo (JP); Akira Ueno, Kochi (JP)

(73) Assignee: Olympus Corporation, Tokyo (JP)

( * ) Notice: Subject to any disclaimer, the term of this patent is extended or adjusted under 35 U.S.C. 154(b) by 96 days.

(21) Appl. No.: 11/598,191

(22) Filed: Nov. 13, 2006

(65) Prior Publication Data

US 2007/0109399 A1    May 17, 2007

(30) Foreign Application Priority Data

Nov. 14, 2005    (JP) .............................. 2005-328511

(51) Int. Cl.
*H01L 27/00* (2006.01)
*G01J 1/44* (2006.01)

(52) U.S. Cl. ................................ 250/208.1; 250/214 R

(58) Field of Classification Search .............. 250/208.1, 250/214 R, 201.5; 348/240.99, 240.1, 240.2, 348/240.3, 340, 335, 359, 360; 359/745–748
See application file for complete search history.

(56) References Cited

U.S. PATENT DOCUMENTS

| | | | | |
|---|---|---|---|---|
| 5,818,527 A * | 10/1998 | Yamaguchi et al. | ......... | 348/335 |
| 6,389,179 B1 * | 5/2002 | Katayama et al. | ........... | 382/284 |
| 6,538,691 B1 * | 3/2003 | Macy et al. | ............... | 348/222.1 |
| 6,873,358 B1 * | 3/2005 | Shimizu | ................. | 348/240.99 |
| 7,076,086 B2 * | 7/2006 | Miyake et al. | .............. | 382/112 |
| 7,260,271 B2 * | 8/2007 | Funamoto | ................... | 382/275 |
| 2003/0218683 A1 * | 11/2003 | Kurase | ....................... | 348/335 |
| 2004/0017491 A1 * | 1/2004 | Stavely | ..................... | 348/240.2 |
| 2005/0053307 A1 * | 3/2005 | Nose et al. | ................... | 382/275 |
| 2006/0110050 A1 * | 5/2006 | Aoyama et al. | ............. | 382/232 |

FOREIGN PATENT DOCUMENTS

JP    10-233950 A    9/1998

* cited by examiner

*Primary Examiner*—Georgia Y. Epps
*Assistant Examiner*—Pascal M Bui-Pho
(74) *Attorney, Agent, or Firm*—Westerman, Hattori, Daniels & Adrian, LLP.

(57) ABSTRACT

A video image capture device of the present invention includes: an optical system having distortion characteristics which enlarge the center portion and compress the peripheral portions; an image sensor which performs photoelectric conversion of a subject image focused by the optical system to output as original image data; a distortion correction circuit which corrects distortion in the original image data; an instruction portion which sets the size of an extraction angle of view for the original image data before correction of distortion; and a recording device which, taking the angle of view of the original image data to be a first angle of view, stores in succession image data corresponding to the first angle of view of the original image data and, as pairs, image data corresponding to a second angle of view narrower than the first angle of view set by the instruction portion.

18 Claims, 12 Drawing Sheets

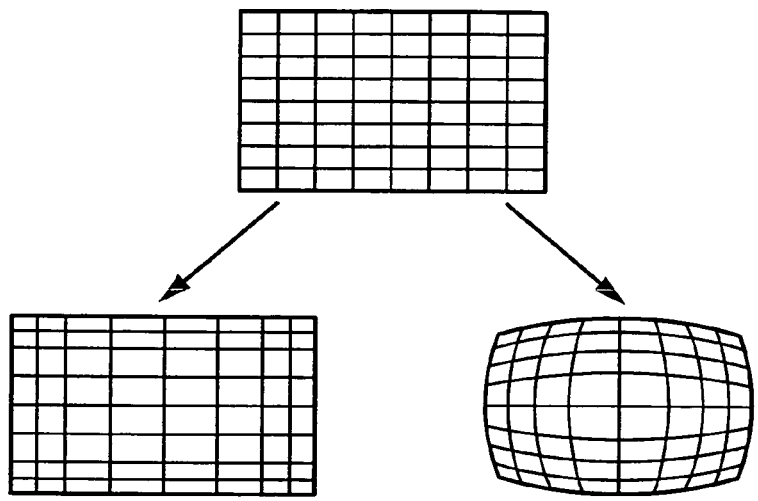
FIG. 2A
FIG. 2B  FIG. 2C
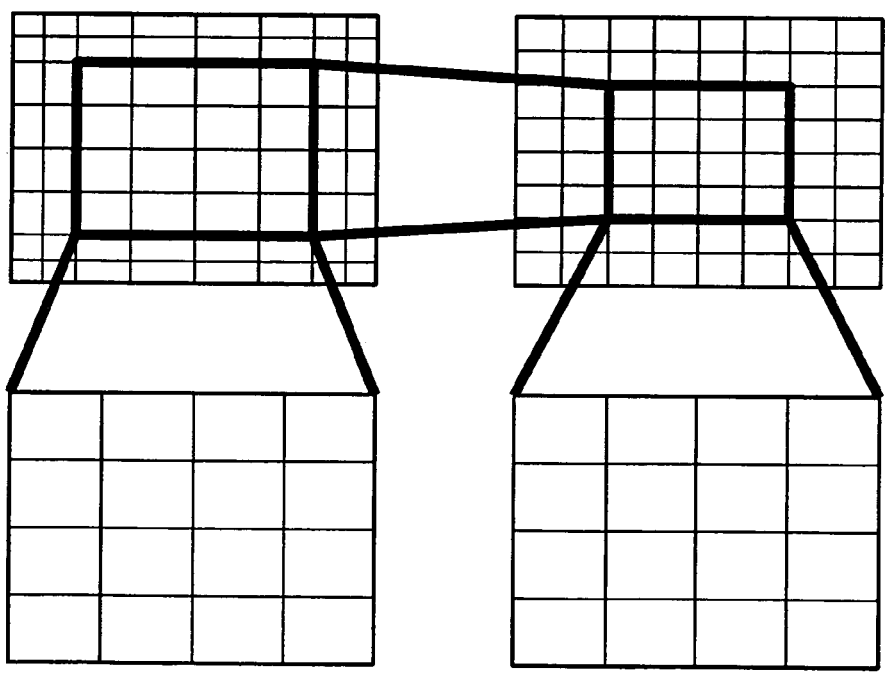
FIG. 3A  FIG. 3B
FIG. 3C  FIG. 3D

VIDEO IMAGE CAPTURE DEVICE

BACKGROUND OF THE INVENTION

1. Field of the Invention

This invention relates to a video image capture device, and in particular relates to a video image capture device which performs zoom operations using an optical system having distortion characteristics.

Priority is claimed on Japanese Patent Application No. 2005-328511, filed Nov. 14, 2005, the content of which is incorporated herein by reference.

2. Description of Related Art

In image input devices such as camcorders, and digital cameras, zoom functions are widely used, in which the lens focal distance is modified so as to freely enlarge and reduce an image, corresponding to the distance to the subject for image capture and the size occupying the angle of view. Such zoom functions are broadly divided into optical zoom, which is ordinarily realized by mechanically moving an internal lens, and electronic zoom, in which a portion of the image data output from an image sensor is enlarged. Compared with the optical zoom, the electronic zoom requires no driving portions and is compact and inexpensive, but image quality suffers because a portion of the image data is enlarged.

In Japanese Unexamined Patent Application, First Publication No. 10-233950, an electronic zoom image data input method is proposed. This image data input method employs a fixed-focal distance image input optical system having a function for compressing the peripheral portion of an input image and a light-receiving element with primarily uniform pixel density which receives the light of the image. In this image data input method, zoom image data at an equivalent resolution is realized in the area of operation owing to a function for correction conversion of optically received images of the light-receiving element including distortion caused by compression. By adopting such a method, although image quality degradation in the peripheral portion cannot be avoided, image data in the center portion of the image with minimal degradation of both wide-angle image data and of telescopic image data can be obtained.

When the zoom image capture is performed using a camcorder, digital camera or similar, the position of the image for zoom capture is sought using a wide-angle image, and when the position of the image for zoom image capture is thus determined, zoom operation is performed using this position, and a zoom image of the desired subject is captured. When performing zoom image capture, moreover, the device returns to a wide-angle image to confirm the angle of view. Hence the ability to rapidly select and display a wide-angle image and a zoom image is desirable. Moreover, at the time of reproduction the ability to rapidly select and display a wide-angle image and a zoom image is desirable.

SUMMARY OF THE INVENTION

A video image capture device of this invention simultaneously records the maximum-angle video image data, which is the largest optical image that can be optically received by the image sensor, and video image data at an arbitrary angle of view selected by the user, and reproduces and displays video image data using both the maximum-angle video image data and the video image data at the arbitrary angle of view selected by the user.

That is, a video image capture device of this invention has an optical system having distortion characteristics which enlarge the center portion and compress the peripheral portion; an image sensor which performs photoelectric conversion of a subject image focused by the optical system to output as original image data; a distortion correction circuit which corrects distortion contained in the original image data; an instruction portion which sets the size of the angle of view for extraction from the original image data prior to the distortion correction; and a recording device which stores in succession image data corresponding to a first angle of view of the original image data taking the angle of view of the original image data as the first angle of view, and image data corresponding to a second angle of view, narrower than the first angle of view, and set by the instruction portion.

In this video image capture device, first corrected image data, corresponding to the first angle of view of the original image data and output by the distortion correction circuit, may be stored in the recording device as image data corresponding to the first angle of view; and second corrected image data, corresponding to the second angle of view of the original image data and output by the distortion correction circuit, may be stored in the recording device as image data corresponding to the second angle of view. In the above-described video image capture device, a monitor which displays images and a display circuit which controls display by the monitor may be further provided, and this display circuit may cause the monitor to display the second corrected image data at the time of image capture.

In the above-described video image capture device, a monitor which displays images and a display circuit which controls display by the monitor may be further provided, and this display circuit may cause the monitor to display the first corrected image data at the time of image capture.

In the above-described video image capture device, the display circuit may cause a frame of the second angle of view to be displayed on the first corrected image data.

In the above-described video image capture device, a monitor which displays images and a display circuit which controls display by the monitor may be further provided, and the display circuit may cause display in juxtaposition on the monitor of the first corrected image data and the second corrected image data at the time of image capture.

In the above-described video image capture device, a monitor which displays images and a display circuit which controls display by the monitor may be further provided, and during reproduction the display circuit may display on the monitor second corrected image data read in succession from the recording device, while also switching to the first corrected image data read from the recording device at an arbitrary time.

In the above-described video image capture device, a monitor which displays images and a display circuit which controls display by the monitor may be further provided, and during reproduction the display circuit may display on the monitor the first corrected image data read in succession from the recording device, while also switching to the second corrected image data read from the recording device at an arbitrary time. In the above-described video image capture device, a monitor which displays images and a display circuit which controls display by the monitor may be further provided, and during reproduction the display circuit may display on the monitor, in juxtaposition, the first corrected image data and the second corrected image data read in succession from the recording device.

In the above-described video image capture device, original image data at the first angle of view including distortion may be stored in the recording device as the image data corresponding to the first angle of view, and second corrected image data, corresponding to the second angle of view of the original image data and output from the distortion correction circuit, may be stored in the recording device as the image data corresponding to the second angle of view.

In the above-described video image capture device, a monitor which displays images and a display circuit which controls display by the monitor may be further provided, and during reproduction the display circuit may display on the monitor first corrected image data corresponding to the first angle of view of original image data and output from the distortion correction circuit.

In the above-described video image capture device, a monitor which displays images and a display circuit which controls display by the monitor may be further provided, and during image capture the display circuit may display on the monitor, in juxtaposition, the second corrected image data, and the first corrected image data corresponding to the first angle of view of original image data and output from the distortion correction circuit.

In the above-described video image capture device, a monitor which displays images and a display circuit which controls display by the monitor may be further provided, and during reproduction the display circuit may display on the monitor the second corrected image data read in succession from the recording device, and in addition may at an arbitrary time switch to display of the first corrected image data corresponding to the first angle of view of original image data, and output after correction by the distortion correction circuit of the original image read from the recording device.

In the above-described video image capture device, a monitor which displays images and a display circuit which controls display by the monitor may be further provided, and during reproduction the display circuit may display on the monitor the first corrected image data corresponding to the first angle of view of original image data, and output after correction by the distortion correction circuit of the original image read in succession from the recording device, and in addition may at an arbitrary time switch to display of the second corrected image data read from the recording device.

In the above-described video image capture device, a monitor which displays images and a display circuit which controls display by the monitor may be further provided, and during reproduction the display circuit may display on the monitor, in juxtaposition, the first corrected image data corresponding to the first angle of view of the original image data, and output after correction by the distortion correction circuit of the original image read in succession from the recording device, and the second corrected image data.

In the above-described video image capture device, a monitor which displays images and a display circuit which controls display by the monitor may be further provided, and during reproduction the distortion correction circuit may correct distortions in the original image data corresponding to a third angle of view set by the instruction portion within the original image read from the recording device and may output third corrected image data, and in addition the display circuit may display on the monitor the third corrected image data.

BRIEF DESCRIPTION OF THE DRAWINGS

FIG. 2A through FIG. 2C are explanatory diagrams showing an optical system having distortion;

FIG. 3A through FIG. 3D are explanatory diagrams showing zoom processing using an optical system having distortion;

DETAILED DESCRIPTION OF THE INVENTION

Image capture operation of video image capture devices of the embodiments of the present invention will be now explained below, with reference to the drawings.

First Embodiment

Figure 1:
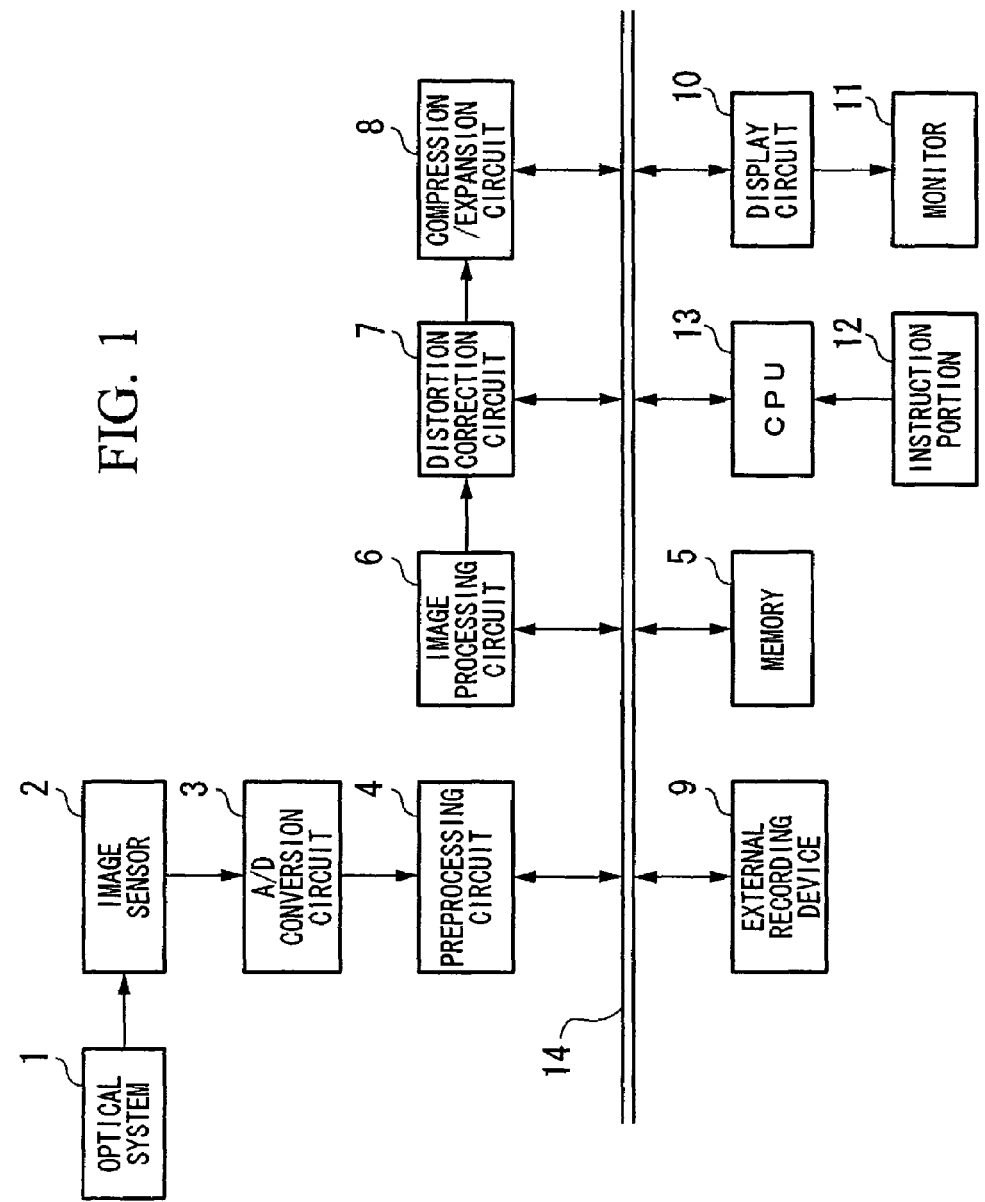
FIG. 1 is a block diagram showing the configuration of a first embodiment of the invention.

FIG. 1 is a block diagram showing the configuration of the video image capture device of a first embodiment of the invention. In FIG. 1, an optical system 1 has distortion such that the center portion is enlarged and the peripheral portion is reduced.

The subject image light condensed by the optical system 1 is focused at the light-receiving face of an image sensor 2. The image sensor 2 receives the optical image and converts this into electrical signals. As the image sensor 2, a CCD (Charge Coupled Device) image sensor or a CMOS (Complementary MOS) image sensor is used. An RGB filter is affixed in a Bayer arrangement to the light-receiving face of the image sensor 2. The output signals from the image sensor 2 are converted into digital signals by an A/D conversion circuit 3 and sent to a preprocessing circuit 4.

The preprocessing circuit 4 performs correction of pixel defects in the captured image signals input from the A/D conversion circuit 3, as well as OB subtraction processing and other adjustments. The captured image signals, with corrections and adjustments performed, are sent to a memory 5 via a data bus 14. The memory 5 temporarily stores image data and similar. The memory 5 used is SDRAM (Synchronous Dynamic Random Access Memory) or similar.

The data bus 14 connects the preprocessing circuit 4, the memory 5, an image processing circuit 6, a distortion correction circuit 7, a compression/expansion circuit 8, an external recording device 9, a display circuit 10, and a CPU (Central Processing Unit) 13.

The image processing circuit 6 takes as input from the memory 5 the captured image signals, and performs processing to generate luminance signals Y and chrominance signals Cb, Cr from the captured image signals, eliminate noise in the image data, and similar.

The distortion correction circuit 7 performs correction of distortion of the image data input from the image processing circuit 6.

The compression/expansion circuit 8 performs processing to compress image data using the JPEG (Joint Photographic Experts Group), MPEG (Moving Picture Coding Experts Group), and other compression methods, and to expand image data which has been compressed using the JPEG, MPEG, and other compression methods.

The external recording device 9 is configured from semiconductor memory, magnetic memory or similar, and records compressed video image data compressed by the compression/expansion circuit 8, and reads previously recorded compressed video image data.

The display circuit 10 generates synchronization signals to output image data to the monitor 11, and sizes image data to the display size of the LCD (Liquid Crystal Display) or other monitor 11. The output signals from the display circuit 10 are sent to the monitor 11 and displayed on the monitor 11.

The instruction portion 12 is provided with operation buttons for use by the user; the instruction portion 12 is used to issue instructions to change the angle of view of image data, change the method of display of image data, and similar. Instruction signals from the instruction portion 12 are sent to the CPU 13. The CPU 13 controls operation of the entire device.

In the first embodiment of the invention, the optical system 1 having distortion is used, as explained above. FIG. 2A through FIG. 2C show the characteristics of such an optical system having distortion.

When the image shown in FIG. 2A is captured by an optical system having distortion, optical images such as those shown in FIG. 2B or FIG. 2C result.

FIG. 2B shows an example of an optical image captured by an optical system in which distortion is caused such that the closer to the periphery, the more compression occurs, independently in the vertical and horizontal directions. FIG. 2C shows an example of an optical image captured by an optical system in which barrel distortion is caused to occur such that the greater the distance from the concentric-circular center of the coaxial optical system, the greater is the compression. In this way, an optical system of this invention having large distortion is configured such that the center portion is enlarged and the peripheral portions are reduced; optical distortion which combines these can also be realized. Below, the example of the distortion of FIG. 2B is used in explanations.

From FIG. 3A to FIG. 3D show image data in which a portion of the image data obtained by the image sensor 2 is extracted, and electronic zooming is performed. FIG. 3A shows image data captured by an optical system 1 having large distortion; FIG. 3C shows an example of electronic zoom image data obtained from the image data of FIG. 3A. FIG. 3B shows image data captured by a normal optical system with small distortion. FIG. 3D shows an example of electronic zoom image data obtained from the image data of FIG. 3B. In this way, when obtaining electronic zoom image data with the same angle of vie, the area of the captured image data is larger when using an optical system having larger distortion.

Figure 4:
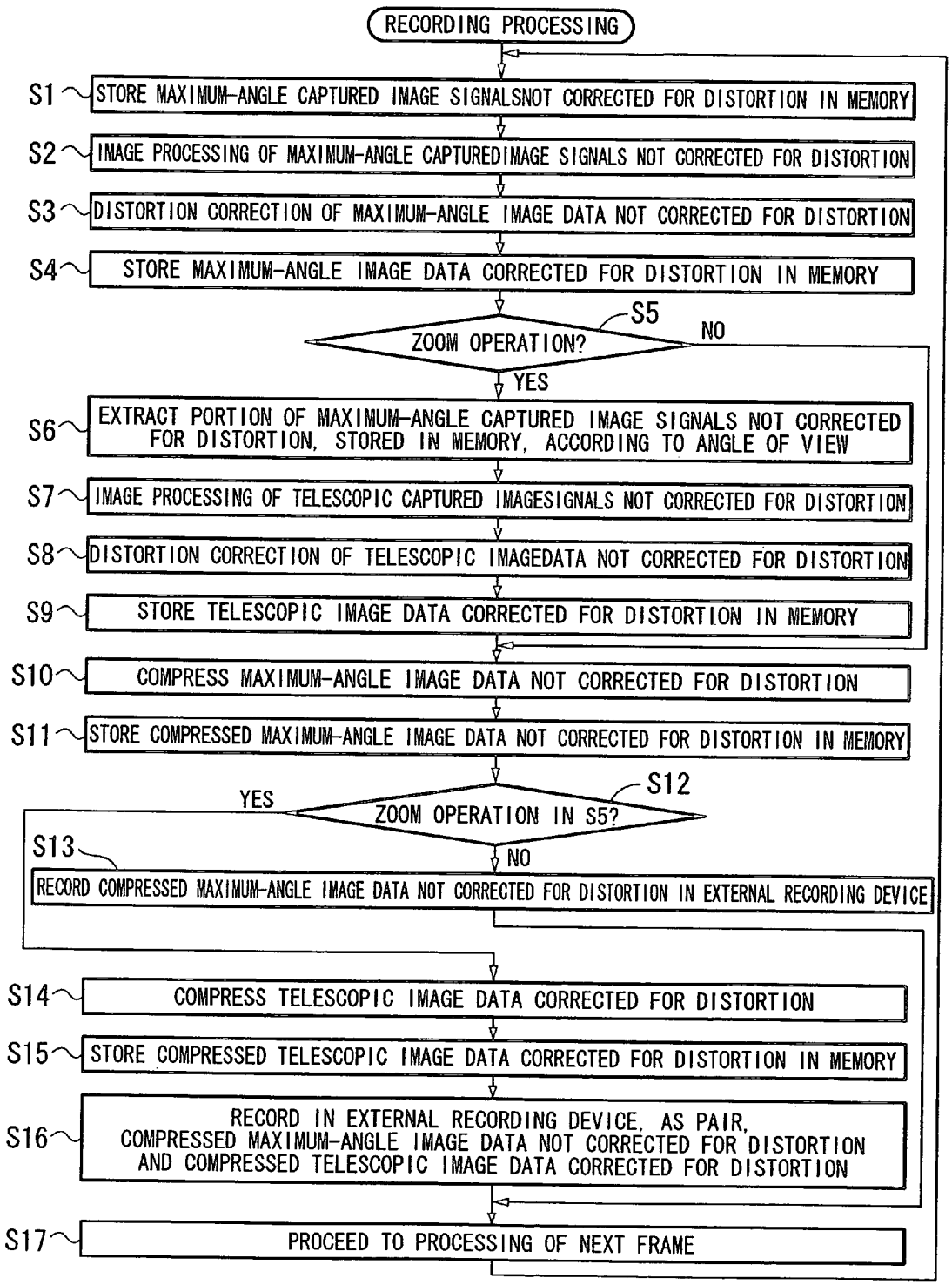
FIG. 4 is a flowchart showing recording processing used in the first embodiment of the invention.

Next, image capture operation for the video image capture device of the first embodiment of the invention is explained, referring to the flowchart of FIG. 4.

The optical image obtained via the optical system 1 with large distortion in FIG. 1 is received by the image sensor 2 and converted into electrical signals. Signals output from the image sensor 2 are maximum-angle captured image signals, which are signals for the largest optical image that can be captured by the image sensor 2, uncorrected for distortion.

In FIG. 4, the maximum-angle captured image signals from the image sensor 2, uncorrected for distortion, and converted into digital signals by the A/D conversion circuit 3, and after performing pixel defect correction, OB subtraction processing and other adjustments by the preprocessing circuit 4, the results are output to the memory 5. In this way, maximum-angle captured image signals uncorrected for distortion are stored in the memory 5 (step S1).

These maximum-angle captured image signals uncorrected for distortion are output from the memory 5 to the image processing circuit 6, and in the image processing circuit 6 are converted into luminance signals Y and chrominance signals Cb, Cr, and gamma correction and other image processing is performed (step S2). The maximum-angle image data, uncorrected for distortion but with image processing performed by the image processing circuit 6, is then input to the distortion correction circuit 7, and in the distortion correction circuit 7, distortion in the maximum-angle image data is corrected (step S3). Maximum-angle image data with distortion corrected by the distortion correction circuit 7 is then output to and stored in the memory 5 (step S4).

When performing a zoom operation, the user presses an operation button on the instruction portion 12 (step S5). When the operation button on the instruction portion 12 is operated, an arbitrary angle of view set by the user using the operation button of the instruction portion 12 is sent to the CPU 13, and an image read command is sent from the CPU 13 to memory 5. By this means, a portion of the maximum-angle captured image signals, uncorrected for distortion and stored in the memory 5, is extracted according to the angle of view thus set (step S6). The extracted partial captured image signals are hereafter called "telescopic captured image signals".

Telescopic captured image signals not corrected for distortion are output from the memory 5 to the image processing circuit 6, and in the image processing circuit 6, image processing is performed for noise elimination, conversion into luminance signals Y and chrominance signals Cb, Cr, gamma correction, and similar (step S7). Telescopic image data subjected to image processing by the image processing circuit 6 but not corrected for distortion is then input to the distortion correction circuit 7, and in the distortion correction circuit 7, the distortion in the telescopic image data is corrected (step S8). Correspondence information, indicating the maximum-angle image data with distortion correction with which the data is paired, is appended to the telescopic image data with distortion corrected by the distortion correction circuit 7, and the data is output to and stored in the memory 5 (step S9).

When the user performs a zoom operation (step S5), maximum-angle image data corrected for distortion, and telescopic image data corrected for distortion, are stored in the memory 5 (see step S4 and step S9).

Next, the maximum-angle image data with distortion corrected, stored in the memory 5, is output to the compression/expansion circuit 8, and in the compression/expansion circuit 8, the maximum-angle image data with distortion corrected is compressed to the JPEG format (step S10). The compressed maximum-angle image data with distortion corrected is output to and stored in the memory 5 (step S11). When in step S5 no zoom operation is performed (step S12), the compressed maximum-angle image data with distortion corrected stored in the memory 5 is output to and stored in the external recording device 9 (step S13), and processing proceeds to step S17.

On the other hand, when the user performs a zoom operation (step S12), telescopic image data with distortion corrected which is stored in the memory 5 is output to the compression/expansion circuit 8, and in the compression/expansion circuit 8 the telescopic image data with distortion corrected is compressed to JPEG format (step S14). The compressed telescopic image data with distortion corrected is output to and stored in the memory 5 (step S15).

Compressed maximum-angle image data with distortion corrected and compressed telescopic image data with distortion corrected, stored in the memory 5, are output to and stored in the external recording device 9 (step S16). In this way, when the user performs a zoom operation, the external recording device 9 records, as a pair, the compressed maximum-angle image data with distortion corrected and compressed telescopic image data with distortion corrected (step S16).

The above processing from S1 to S16 is performed in single frame units, and by performing this processing continuously for a plurality of frames, a video captured image operation results.

Figure 5:
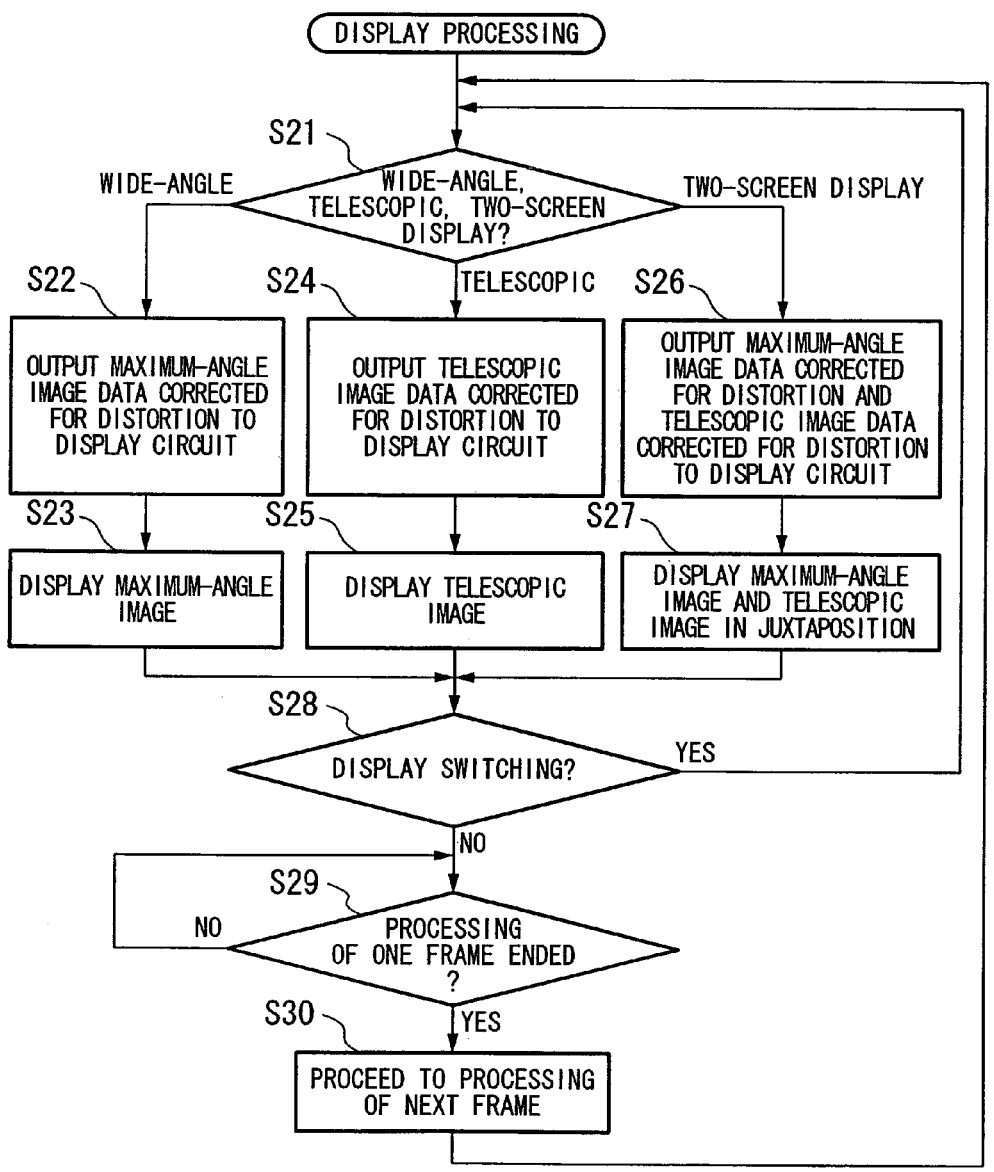
FIG. 5 is a flowchart showing display processing used in the first embodiment of the invention.

When processing of one frame ends, processing proceeds to the next frame (step S17), returning to step S1 to perform processing of the next frame. Next, a method of display of image data and the time of image capture by the video image capture device of the first embodiment of the invention will be explained. In the first embodiment of the invention, the user can use an operation button of the instruction portion 12 to set the device to wide-angle display, telescopic display, and two-screen display. FIG. 5 is a flowchart showing display processing in the first embodiment of the invention.

Figure 7A:
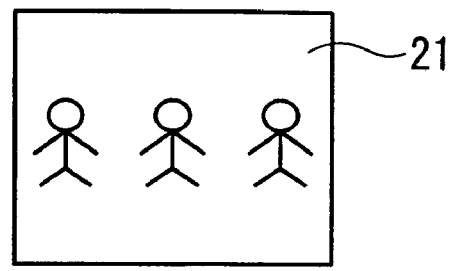
FIG. 7A through FIG. 7D are explanatory diagrams showing various displays in the invention.

In FIG. 5, a judgment is made as to whether the setting is wide-angle display, telescopic display, or two-screen display (step S21). If in step S21 wide-angle display is selected, the maximum-angle image data corrected for distortion stored in the memory 5 is output to the display circuit 10 (step S22). The display circuit 10 sizes the maximum-angle image data according to the angle of view of the monitor 11 while outputting the data, one frame at a time, to the monitor 11. By this means, the maximum-angle-of-view images 21 are displayed on the monitor 11, as shown in FIG. 7A (step S23).

Figure 7B:
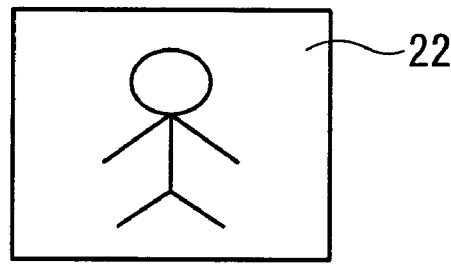

When in step S21 the telescopic display is selected, the telescopic image data corrected for distortion stored in the memory 5 is output to the display circuit 10 (step S24). The display circuit 10 sizes the image data according to the angle of view of the monitor 11 while outputting the data to the monitor 11 one frame at a time. By this means, telescopic images 22 are displayed on the monitor 11, as shown in FIG. 7B (step S25).

Figure 7C:
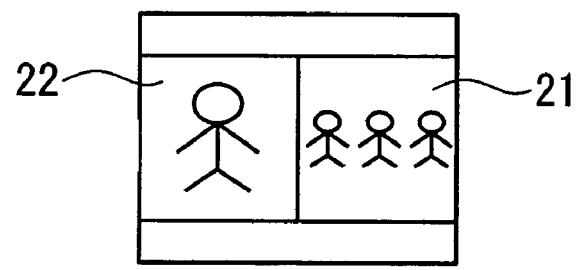

When in step S21 two-screen display is selected, the maximum-angle-of-view image data corrected for distortion and the telescopic image data corrected for distortion, stored in the memory 5, are output to the display circuit 10 (step S26). By this means, the maximum-angle-of-view image 21 and telescopic image 22 are displayed in juxtaposition, as shown in FIG. 7C (step S27).

Here, a judgment is made as to whether the display settings have been changed (step S28). If the display settings have been changed, processing returns to step S21. In step S21, a judgment is then made as to whether the setting has been switched to wide-angle display, to telescopic display, or to two-screen display.

In the case of switching to wide-angle display, the processing of steps S22 and S23 is performed, and the maximum-angle-of-view image is displayed. In the case of switching to telescopic display, the processing of steps S24 and S25 is performed, and the telescopic image is displayed. In the case of switching to two-screen display, the processing of steps S26 and S27 are performed, and the maximum-angle-of-view image and telescopic image are displayed in juxtaposition.

A judgment is made as to whether one frame's worth of processing has ended (step S29), and if one frame's worth of processing has ended, processing of the next frame is begun (step S30), processing returns to step S21, and processing of the next frame is performed.

In the first embodiment of the invention, during wide-angle display, a zoom frame may also be displayed.

Figure 6:
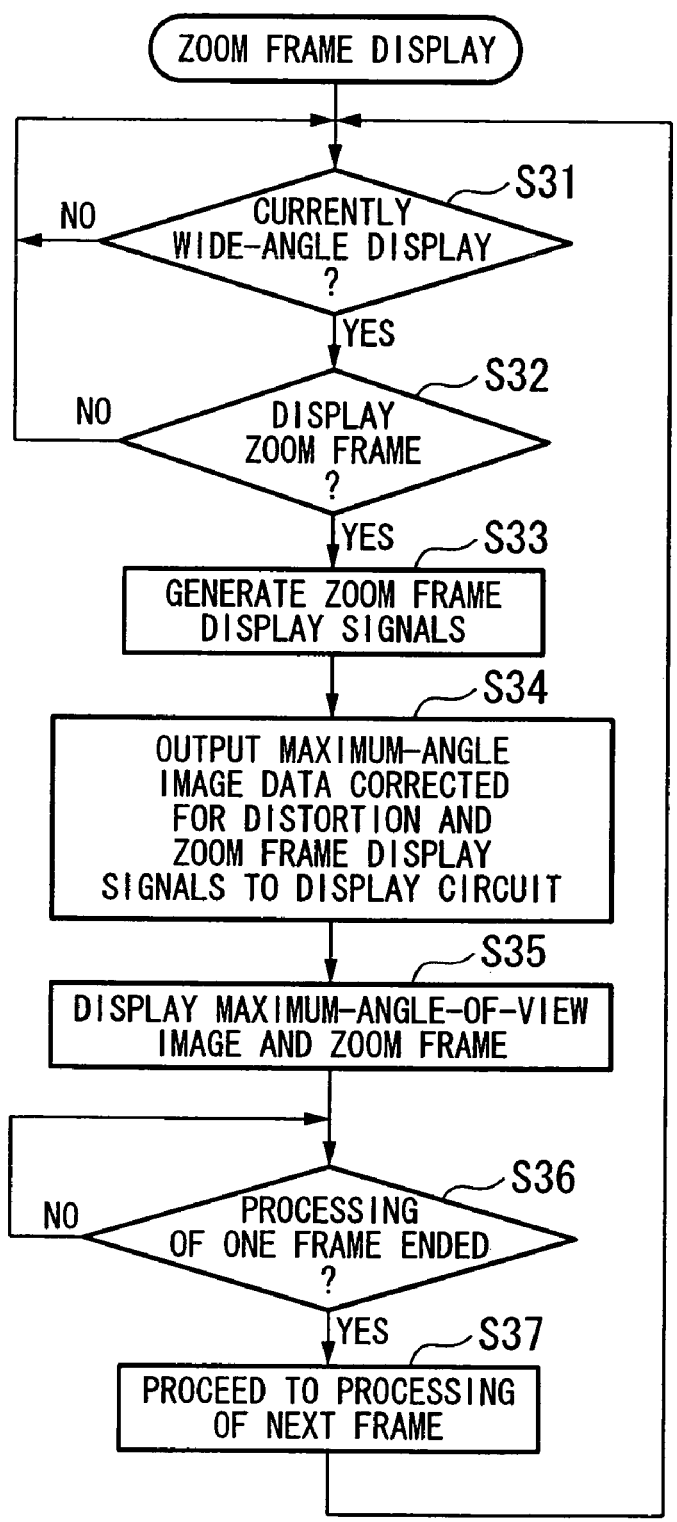
FIG. 6 is a flowchart showing zoom frame display processing used in the first embodiment of the invention.
Figure 7D:
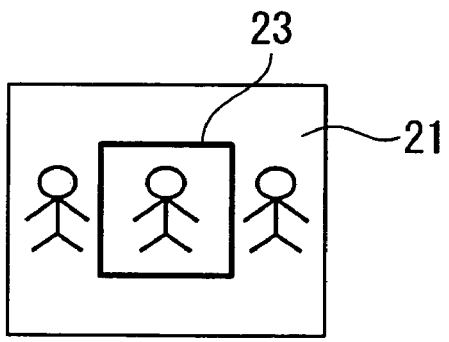

FIG. 6 is a flowchart showing processing when a zoom frame is displayed. In FIG. 6, a judgment is made as to whether wide-angle display is being performed (step S31), and if the display is currently wide-angle display, a judgment is made as to whether the user has selected frame display using an operation button of the instruction portion 12 (step S32). If zoom frame display is selected, then a zoom frame display signal is formed according to the screen extracted from memory 5 (step S33). Maximum-angle image data corrected for distortion and stored in memory 5, and frame display signals corresponding to the angle of view which has been set, are sent to the display circuit 10 (step S34). By this means, the maximum-angle-of-view image 21 is displayed on the monitor 11, and a zoom frame 23 showing the telescopic angle of view is displayed, as shown in FIG. 7D (step S35). A judgment is made as to whether one frame's worth of processing has ended (step S36), and if one frame's worth of processing has ended, processing proceeds to the next frame (step S37), returning to step S31, and processing of the next frame is performed.

Next, processing to reproduce compressed video image data in the video image capture device of the first embodiment of the invention will be explained.

Figure 8:
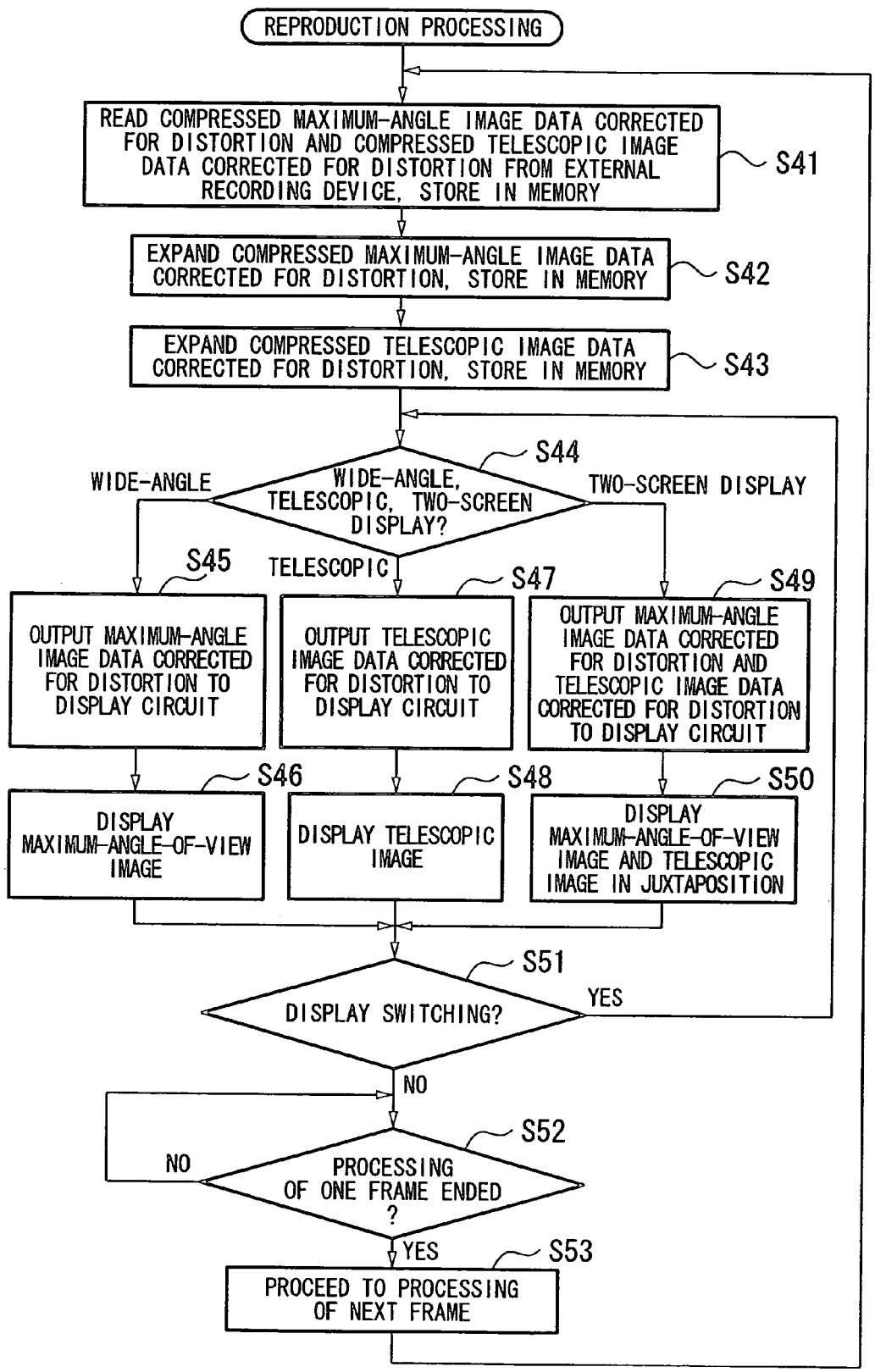
FIG. 8 is a flowchart showing reproduction processing used in the first embodiment of the invention.

FIG. 8 is a flowchart showing reproduction processing. As explained above, when the user performs a zoom operation (step S5), compressed maximum-angle image data corrected for distortion and compressed telescopic image data corrected for distortion are recorded, as a pair, at the time of recording in the external recording device 9 (see step S16). In FIG. 8, at the time of reproduction, the compressed maximum-angle image data corrected for distortion and the compressed telescopic image data corrected for distortion are read from the external recording device 9 and stored in the memory 5 (step S41).

The compressed maximum-angle image data stored in the memory 5 is output to the compression/expansion circuit 8, and in the compression/expansion circuit 8 is expanded using the JPEG format. The expanded maximum-angle image data is stored in the memory 5 (step S42).

On the other hand, compressed telescopic image data stored in the memory 5 is output to the compression/expansion circuit 8, and in the compression/expansion circuit 8 is expanded using the JPET format. The expanded telescopic image data is output to and stored in the memory 5 (step S43).

In the first embodiment of the invention, wide-angle display, telescopic display, or two-screen display can be selected at the time of reproduction. The user performs display selection using an operation button of the instruction portion 12.

A judgment is made as to whether the display at the time of reproduction is a wide-angle display, a telescopic display, or a two-screen display (step S44). In step S44, if the wide-angle display is selected, then maximum-angle image data corrected for distortion which has been stored in the memory 5 is output to the display circuit 10 (step S45). The display circuit 10 resizes the maximum-angle image data according to the angle of view of the monitor 11 while outputting the data to the monitor 11 one frame at a time. By this means, the maximum-angle-of-view image 21 is displayed on the monitor 11, as shown in FIG. 7A (step S46).

When in step S44 the telescopic display has been selected, the telescopic image data corrected for distortion which is stored in the memory 5 is output to the display circuit 10 (step S47). The display circuit 10 resizes the image data according to the angle of view of the monitor 11 while outputting the data to the monitor 11 one frame at a time. By this means, the telescopic image 22 is displayed on the monitor 11 as shown in FIG. 7B (step S48).

When in step S44 two-screen display is selected, the maximum-angle image data corrected for distortion and the telescopic image data corrected for distortion which are stored in the memory 5 are output to the display circuit 10 (step S49). By this means, the maximum-angle-of-view image 21 and telescopic image 22 are displayed in juxtaposition, as shown in FIG. 7C (step S50).

Here, a judgment is made as to whether the display settings have been switched (step S51). If the display settings have been switched, processing returns to step S44, and a judgment is made as to whether settings have been switched to wide-angle display, to telescopic display, or to two-screen display. If switching is to wide-angle display, the processing of steps S45 and S46 is performed, and the maximum-angle-of-view image is displayed. If switching is to telescopic display, the processing of steps S47 and S48 is performed, and the telescopic image is displayed. If switching is to two-screen display, then the processing of steps S49 and S50 is performed, and the maximum-angle-of-view image and telescopic image are displayed in juxtaposition.

Video reproduction operation entails processing of a plurality of frames continuously. A judgment is made as to whether one frame's worth of processing has ended (step S52), and if one frame's worth of processing has ended, processing proceeds to the next frame (step S53), returning to step S41 to process the next frame.

Thus by means of the first embodiment of the invention, maximum-angle-of-view image data and telescopic image data for a single subject can be acquired simultaneously. Hence when selecting the display method at the time of image capture, or when recording maximum-angle-of-view image data and telescopic image data in an external recording device and then reproducing recorded image data, it is possible to switch between displays of maximum-angle-of-view image data and telescopic image data for an arbitrary frame.

Second Embodiment

A second embodiment of the invention will be explained, referring to the drawings. The second embodiment differs from the first embodiment with respect to the maximum-angle image data recorded to the external recording device 9. That is, in the first embodiment, compressed maximum-angle image data corrected for distortion and compressed telescopic image data corrected for distortion were recorded to the external recording device 9 at the time of recording. In contrast, in this second embodiment, compressed maximum-angle image data not corrected for distortion and compressed telescopic image data corrected for distortion are recorded to the external recording device 9. The configuration of the video image capture device in the second embodiment of the invention is similar to that of the first embodiment, and an explanation is omitted.

Figure 9:
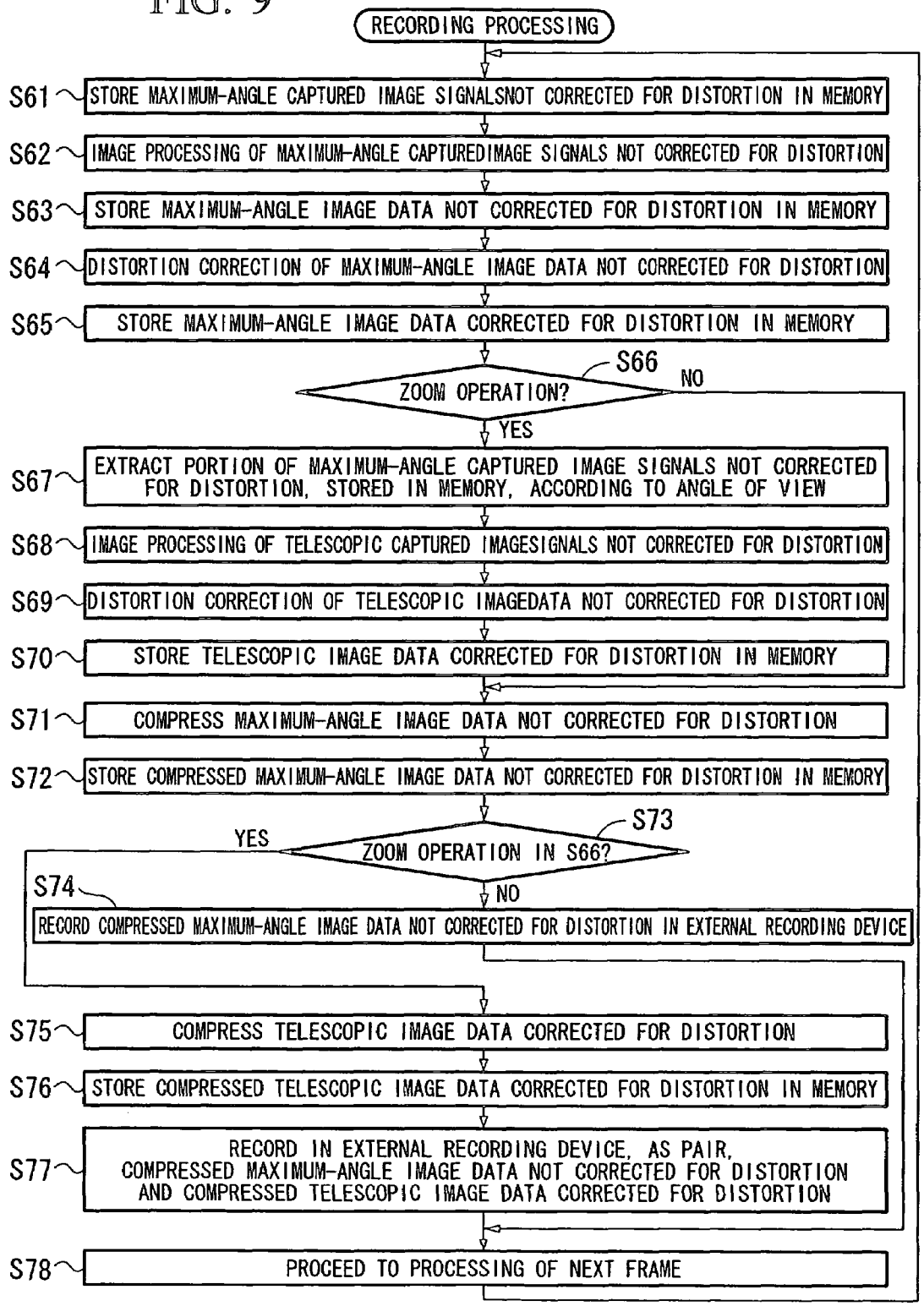
FIG. 9 is a flowchart showing recording processing used in a second embodiment of the invention.

FIG. 9 is a flowchart showing recording processing in the second embodiment of the invention. In FIG. 9, an optical image obtained via the optical system I having substantial distortion is received by the image sensor 2 and converted into electrical signals. The output signals from this image sensor 2 are maximum-angle captured image signals not corrected for distortion, which represent the maximum optical image which can be received by the image sensor 2.

Maximum-angle captured image signals not corrected for distortion which are output from the image sensor 2 are converted to digital signals by the A/D conversion circuit 3. Next, these digital signals are subjected to pixel defect correction, OB subtraction processing and other adjustment by the pre-processing circuit 4, and are then output to memory 5. In this way, maximum-angle captured image signals not corrected for distortion are stored in the memory 5 (step S61).

The maximum-angle captured image signals not corrected for distortion are output from the memory 5 to the image processing circuit 6, and noise elimination, conversion into luminance signals Y and chrominance signals Cb, Cr, gamma correction, and other image processing is performed (step S62). Maximum-angle image data not corrected for distortion but subjected to image processing by the image processing circuit 6 is output to and stored in the memory 5 (step S63).

Maximum-angle image data not corrected for distortion but subjected to image processing by the image processing circuit 6 is input to the distortion correction circuit 7, and the distortion in the maximum-angle image data is corrected (step S64). This maximum-angle image data corrected by the distortion correction circuit 7 is stored in the memory 5 for display (step S65).

When performing a zoom operation, the user operates an operation button of the instruction portion 12 (step S66). When the operation button of the instruction portion 12 is operated, the CPU 13 is notified of an arbitrary angle of view set by the user using the operation button of the instruction portion 12, and an image read command is sent from the CPU 13 to memory 5. By this means, a portion of the maximum-angle captured image signals not corrected for distortion, stored in memory 5, is extracted according to the angle of view thus set (step S67). This extracted portion of the captured image signals is called the telescopic captured image signals.

These telescopic captured image signals not corrected for distortion are output from the memory 5 to the image processing circuit 6, and noise elimination, conversion into luminance signals Y and chrominance signals Cb, Cr, gamma correction, and other image processing is performed (step S68). The telescopic image data not corrected for distortion but with image processing performed by the image processing circuit 6 is input to the distortion correction circuit 7, and the distortion in the telescopic image data is corrected (step S69). To the telescopic image data corrected by the distortion correction circuit 7 is appended correspondence information indicating the maximum-angle image data not corrected for distortion with which the data is paired, and the data is output to and stored in the memory 5 (step S70).

Next, maximum-angle image data not corrected for distortion and saved in the memory 5 is output to the compression/expansion circuit 8, and the maximum-angle image data is compressed using the JPEG format (step S71). The compressed maximum-angle image data not corrected for distortion is output to and stored in the memory 5 (step S72). When a zoom operation is not performed in step S66 (step S73), the compressed maximum-angle image data not corrected for distortion stored in the memory 5 is output to the external recording device 9 and recorded (step S74), and processing proceeds to step S78.

If on the other hand there is a zoom operation in step S66 (step S73), the telescopic image data corrected for distortion and stored in the memory 5 is output to the compression/ expansion circuit 8 and is compressed using the JPEG format (step S75). The compressed telescopic image data corrected for distortion is output to and stored in the memory 5 (step S76).

The compressed maximum-angle image data not corrected for distortion and compressed telescopic image data corrected for distortion, stored in the memory 5, are output to and recorded in the external recording device 9 (step S77). In this way, when the user has performed a zoom operation, compressed maximum-angle image data not corrected for distortion and compressed telescopic image data corrected for distortion are stored, as a pair, in the external storage device 9 (step S77).

The above processing from S61 to S77 is performed in single frame units, and by performing this processing continuously for a plurality of frames, video captured image operation results.

When one frame's worth of processing ends, processing proceeds to the next frame (step S78), returning to step S61 to perform processing of the next frame.

Next, display processing in the second embodiment of the invention is explained. In the second embodiment of the invention, the user can use an operation button of the instruction portion 12 to set wide-angle display, telescopic display, or two-screen display.

Figure 10:
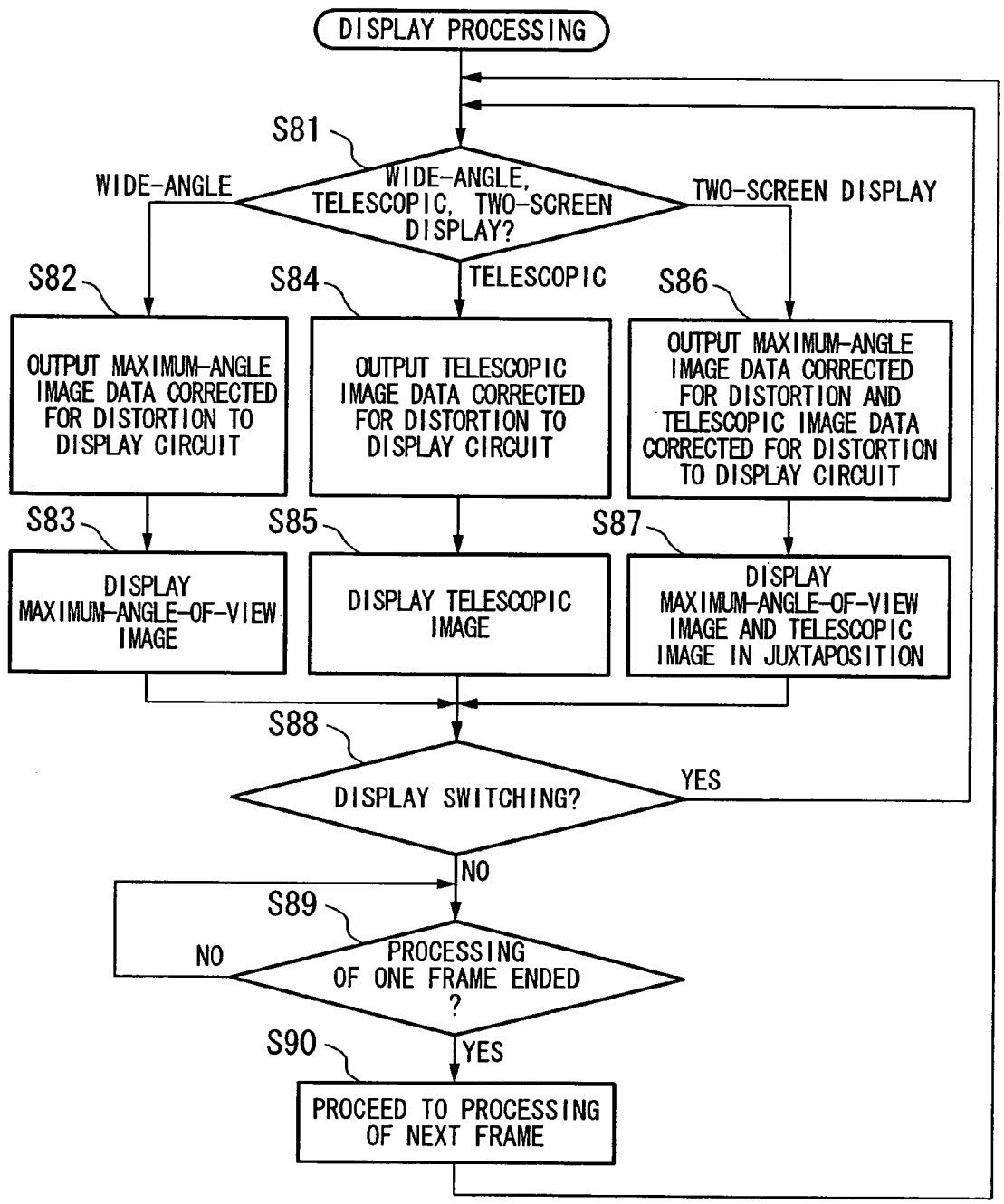
FIG. 10 is a flowchart showing display processing used in the second embodiment of the invention.

FIG. 10 is a flowchart showing display processing in the second embodiment of the invention. In FIG. 10, a judgment is made as to whether the setting is for wide-angle display, telescopic display, or two-screen display (step S81). If in step S81 wide-angle display is selected, the maximum-angle image data corrected for distortion stored in the memory 5 is output to the display circuit 10 (step S82). The display circuit 10 resizes the maximum-angle image data according to the angle of view of the monitor 11 while outputting the data to the monitor 11, one frame at a time. By this means, maximum-angle-of-view images 21 are displayed on the monitor 11, as shown in FIG. 7A (step S83).

When in step S81 the telescopic display is selected, the telescopic image data corrected for distortion stored in the memory 5 is output to the display circuit 10 (step S84). The display circuit 10 resizes the image data according to the angle of view of the monitor 11 while outputting the data to the monitor 11 one frame at a time. By this means, telescopic images 22 are displayed on the monitor 11, as shown in FIG. 7B (step S85).

When in step S81 the two-screen display is selected, the maximum-angle image data corrected for distortion and telescopic image data corrected for distortion, stored in the memory 5, are output to the display circuit 10 (step S86). By this means, the maximum-angle-of-view image 21 and telescopic image 22 are displayed in juxtaposition, as shown in FIG. 7C (step S87).

Here, a judgment is made as to whether there has been switching of the display settings (step S88). If the display settings have been switched, processing returns to step S81. In step S81, a judgment is made as to whether switching has been to the wide-angle display, telescopic display, or two-screen display.

In the case of switching to wide-angle display, the processing indicated in steps S82 and S83 is performed, and the maximum-angle-of-view image is displayed. In the case of switching to telescopic display, the processing indicated in steps S84 and S85 is performed, and the telescopic image is displayed. In the case of switching to two-screen display, the processing indicated in steps S86 and S87 is performed, and the maximum-angle-of-view image and telescopic image are displayed in juxtaposition.

A judgment is made as to whether one frame's worth of processing has ended (step S89), and if one frame's worth of processing has ended, processing proceeds to the next frame (step S90), returning to step S81, and processing of the next frame is performed.

In the second embodiment of the invention, during wide-angle display, a zoom frame may also be displayed.

Figure 11:
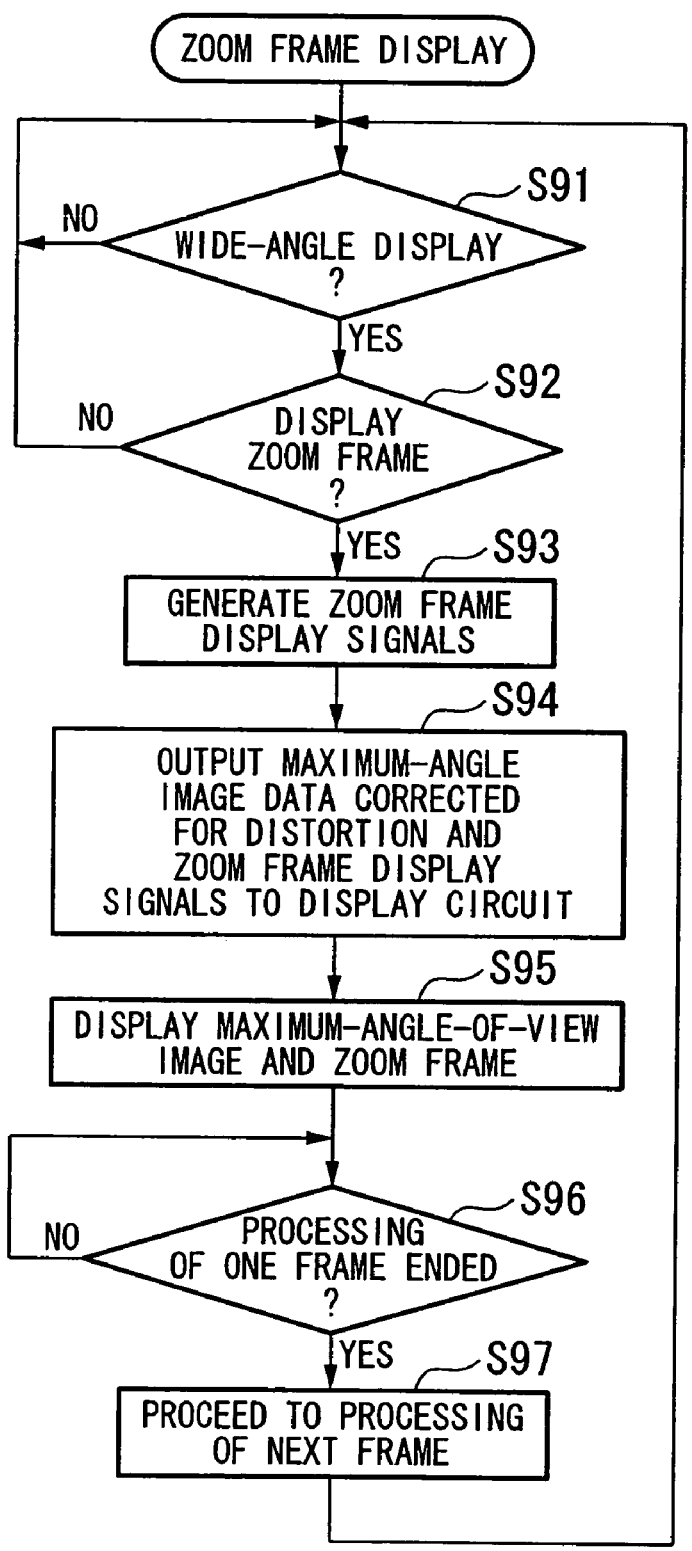
FIG. 11 is a flowchart showing zoom frame display processing used in the second embodiment of the invention.

FIG. 11 is a flowchart showing processing when the zoom frame is displayed. In FIG. 11, a judgment is made as to whether the display is the wide-angle display (step S91), and if the wide-angle display is set, a judgment is made as to whether the user has selected frame display using an operation button of the instruction portion 12 (step S92). If zoom frame display has been selected, zoom frame display signals are formed according to a screen extracted from memory (step S93). Maximum-angle image data corrected for distortion and stored in the memory 5, and frame display signals corresponding to the preset angle of view, are sent to the display circuit 10 (step S94). By this means, the maximum-angle-of-view image 21 is displayed on the monitor 11 as shown in FIG. 7D, and the zoom frame 23 for the telescopic angle of view is displayed (step S95). A judgment is made as to whether one frame's worth of processing has ended (step S96), and if one frame's worth of processing has ended, processing proceeds to the next frame (step S97), returning to step S91, and the next frame is processed.

Next, processing to reproduce compressed video image data in the video image capture device of the second embodiment of the invention is explained.

Figure 12:
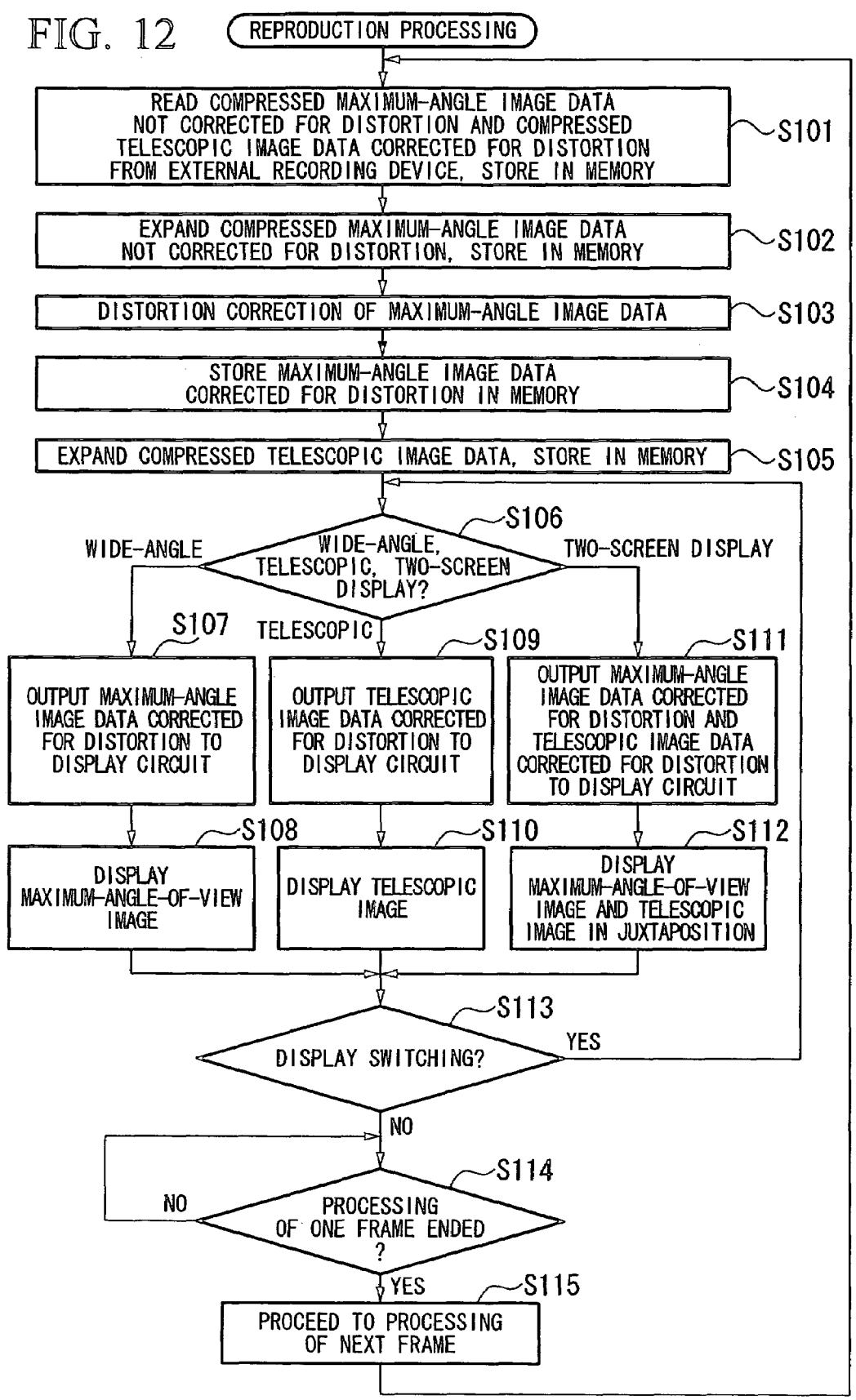
FIG. 12 is a flowchart showing reproduction processing used in the second embodiment of the invention.

FIG. 12 shows reproduction processing in the second embodiment of the invention. As explained above, when the user performs a zoom operation (step S66), compressed maximum-angle image data not corrected for distortion and compressed telescopic image data corrected for distortion are recorded in the external recording device 9 at the time of recording (see step S77). In FIG. 12, at the time of reproduction, the compressed maximum-angle image data not corrected for distortion and compressed telescopic data corrected for distortion are read from the external recording device 9 based on correspondence information, and are stored in the memory 5 (step S101).

Compressed maximum-angle image data not corrected for distortion and stored in the memory 5 is output to the compression/expansion circuit 8, and is expanded using the JPEG format. The expanded maximum-angle image data is stored in the memory 5 (step S102). This expanded maximum-angle image data is output from the memory 5 to the distortion correction circuit 7, and processing to correct distortion is performed (step S103). The maximum-angle image data corrected for distortion is then stored in the memory 5 (step S104).

On the other hand, the compressed telescopic image data stored in the memory 5 is output to the compression/expansion circuit 8, and is expanded using the JPEG format. The expanded telescopic image data is stored in the memory 5 (step S105).

In the second embodiment of the invention, wide-angle display, telescopic display, and two-screen display can be selected at the time of reproduction. The user performs display selection using an operation button of the instruction portion 12.

A judgment is made at the time of reproduction as to whether the display is wide-angle display, telescopic display, or two-screen display (step S106). If in step S106 wide-angle display is selected, the maximum-angle image display corrected for distortion and stored in the memory 5 is output to the display circuit 10 (step S107). The display circuit 10 resizes the maximum-angle image data according to the angle of view of the monitor 11 while outputting the data to the monitor 11 one frame at a time. By this means, a maximum-angle-of-view image 21 is displayed on the monitor 11, as shown in FIG. 7A (step S108).

If in step S106, the telescopic display is selected, the telescopic image data corrected for distortion and stored in the memory 5 is output to the display circuit 10 (step S109). The display circuit 10 resizes the image data according to the angle of view of the monitor 11 while outputting the data to the monitor 11 one frame at a time. By this means, a telescopic image 22 is displayed on the monitor 11, as shown in FIG. 7B (step S110).

If in step S106, the two-screen display is selected, the maximum-angle image data corrected for distortion and the telescopic image data corrected for distortion, stored in the memory 5, are output to the display circuit 10 (step S111). By this means, a maximum-angle-of-view image 21 and telescopic image 22 are displayed in juxtaposition, as shown in FIG. 7C (step S112).

Here, a judgment is made as to whether the display settings have been switched (step S113). If the display settings have been switched, processing returns to step S106. In step S106, a judgment is made as to whether settings have been switched to wide-angle display, to telescopic display, or to two-screen display.

If the settings have been switched to wide-angle display, the processing indicated in steps S107 and S108 is performed, and the maximum-angle-of-view image is displayed. If the switching is to telescopic display, the processing indicated in steps S109 and S10 is performed, and the telescopic image is displayed. If the switching is to two-screen display, the processing indicated in steps S111 and S112 is performed, and the maximum-angle-of-view image and telescopic image are displayed in juxtaposition.

Next, a judgment is made as to whether one frame's worth of processing has ended (step S114), and if one frame's worth of processing has ended, processing proceeds to the next frame (step S115), returning to step S101 to process the next frame.

Video reproduction operation entails processing of a plurality of frames continuously.

The above processing from S101 to S114 is performed in single frame units, and this processing is performed continuously for a plurality of frames.

Figure 13:
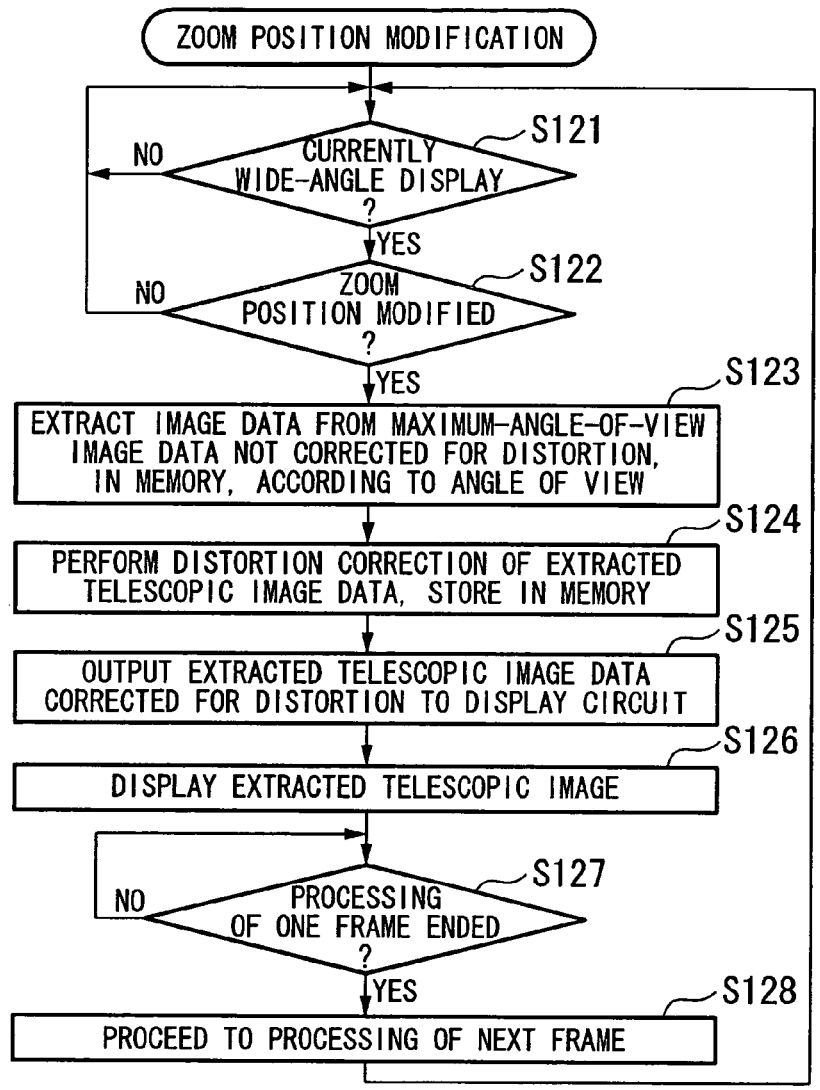
FIG. 13 is a flowchart showing zoom position modification processing used in the second embodiment of the invention; and, FIG. 14 is an explanatory diagram showing the display in zoom position modification processing in the invention.

In the second embodiment of the invention, it is possible to modify the zoom position during wide-angle display at the time of reproduction. FIG. 13 shows processing when modifying the zoom position.

Figure 14:
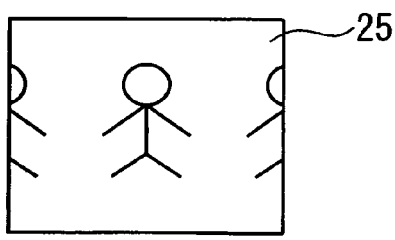

FIG. 13 is a flowchart showing processing when modifying the zoom position. In FIG. 13, a judgment is made as to whether the current display is wide-angle display (step S121), and if the current display is wide-angle display, a judgment is made as to whether the user has modified the zoom position using an operation button of the instruction portion 12 (step S122). If the zoom position has been modified, a screen is extracted from the maximum-angle-of-view data not corrected for distortion, stored in the memory 5, based on the angle of view of the modified zoom position (step S123). The extracted image is sent to the distortion correction circuit 7, distortion is corrected, and the image is stored in the memory 5 (step S124). This telescopic image data corrected for distortion, extracted from the maximum-angle-of-view data, is sent to the display circuit 10 (step S125). By this means, an image 25 with the zoom position modified is displayed on the monitor 11, as shown in FIG. 14 (step S126).

A judgment is made as to whether one frame's worth of processing has ended (step S127), and if one frame's worth of processing has ended, processing proceeds to the next frame (step S128), returning to step S121 to process the next frame.

By means of the above second embodiment of the invention, advantageous results equivalent to those of the first embodiment can be obtained. Further, maximum-angle image data not corrected for distortion is recorded, so that electronic zoom image data with minimal image quality degradation can be reproduced and displayed.

As explained above, by means of a video image capture device of this invention, image data with a first angle of view, that is, wide-angle image data, and image data with a second angle of view, that is, telescopic image data, are recorded in succession as pairs, so that wide-angle and telescopic video image reproduction can be performed rapidly and selectively.

Further, by means of a video image capture device of an embodiment of this invention, image data with a first angle of view after distortion correction, that is, wide-angle image data, and image data with a second angle of view, that is, telescopic image data, are recorded in succession as pairs, so that wide-angle and telescopic video image reproduction can be performed rapidly and selectively using a general-purpose device.

Further, by means of a video image capture device of an embodiment of this invention, at the time of image capture, second corrected image data, that is, telescopic image data, can be displayed on an LCD or other monitor, and image capture can be performed while confirming the angle of view of telescopic image data set by the user.

Further, by means of a video image capture device of an embodiment of this invention, at the time of image capture, first corrected image data, that is, wide-angle image data, can be displayed on an LCD or other monitor, and image capture can be performed while confirming on the monitor the wide-angle image data.

Further, by means of a video image capture device of an embodiment of this invention, by displaying the frame of the second angle of view above the first corrected image data, image capture is possible while simultaneously confirming on the monitor the second angle of view and the peripheral portions thereof.

Further, by means of a video image capture device of an embodiment of this invention, at the time of image capture, image capture of the second corrected image data, that is, telescopic image data, can be performed while confirming on the monitor the first corrected image data, that is, the wide-angle image data.

Further, by means of a video image capture device of an embodiment of this invention, at the time of reproduction, second corrected image data read in succession, that is, telescopic image data is displayed on the monitor, and by switching at an arbitrary time to first corrected image data, that is to wide-angle image data, wide-angle and telescopic video image data can easily be selectively confirmed.

Further, by means of a video image capture device of an embodiment of this invention, at the time of reproduction, first corrected image data read in succession, that is, wide-angle image data is displayed on the monitor, and by switching at an arbitrary time to second corrected image data, that is to telescopic image data, wide-angle and telescopic video image data can easily be selectively confirmed.

Further, by means of a video image capture device of an embodiment of this invention, at the time of reproduction, first corrected image data, that is, wide-angle image data, and second corrected image data, that is, telescopic image data, read in succession from a recording device, are reproduced in juxtaposition on a monitor, so that comparisons can easily be made.

Further, by means of a video image capture device of an embodiment of this invention, by recording as pairs original image data with a first angle of view and second corrected image data, the original image data can be used to correct distortion using another video reproduction device capable of distortion correction, and the angle of view of images can be modified; in addition, in an existing video reproduction device, reproduction of the second corrected image data, that is, of corrected telescopic video image data, is possible.

Further, by means of a video image capture device of an embodiment of this invention, a third angle of view is set for original image data read from a recording device, and distortion in the original image data corresponding to this third angle of view is corrected and the data output and displayed on a monitor, so that image data corrected for distortion can easily be confirmed for an arbitrary angle of view.

This invention is not limited to the above-described embodiments, and various appropriate modifications can be made without deviating from the scope of the invention.

This invention is suitable for use in displaying telescopic images in a digital camera employing an optical system having distortion.

What is claimed is:

1. A video image capture device comprising:
an optical system having distortion characteristics which enlarge the center portion and compress the peripheral portions;
an image sensor which performs photoelectric conversion of a subject image focused by the optical system to output as original image data;
a distortion correction circuit which corrects distortion in the original image data;
an instruction portion which sets the size of an extraction angle of view for the original image data before correction of distortion; and
a recording device which, taking the angle of view of the original image data to be a first angle of view, stores in succession image data corresponding to the first angle of view of the original image data and, as pairs, image data corresponding to a second angle of view narrower than the first angle of view set by the instruction portion.

2. The video image capture device according to claim 1, wherein the recording device stores first corrected image data corresponding to the first angle of view of the original image data output from the distortion correction circuit as the image data corresponding to the first angle of view, and second corrected image data corresponding to the second angle of view of the original image data output from the distortion correction circuit as the image data corresponding to the second angle of view.

3. The video image capture device according to claim 1, further comprising a monitor which displays images and a display circuit which controls display by the monitor, and wherein the display circuit causes the second corrected image data to be displayed on the monitor at the time of image capture.

4. The video image capture device according to claim 2, further comprising a monitor which displays images and a display circuit which controls display by the monitor, and wherein the display circuit causes the first corrected image data to be displayed on the monitor at the time of image capture.

5. The video image capture device according to claim 4, wherein the display circuit causes a frame of the second angle of view to be displayed on the first corrected image data.

6. The video image capture device according to claim 2, further comprising a monitor which displays images and a display circuit which controls display by the monitor, and wherein the display circuit causes the first corrected image data and second corrected image data to be displayed in juxtaposition on the monitor at the time of image capture.

7. The video image capture device according to claim 2, further comprising a monitor which displays images and a display circuit which controls display by the monitor, and wherein the display circuit, at the time of reproduction, causes the second corrected image data read in succession from the recording device to be displayed on the monitor and, at an arbitrary time, switches to display of the first corrected image data read from the recording device.

8. The video image capture device according to claim 2, further comprising a monitor which displays images and a display circuit which controls display by the monitor, and wherein the display circuit, at the time of reproduction, causes the first corrected image data read in succession from the recording device to be displayed on the monitor and, at an arbitrary time, switches to display of the second corrected image data read from the recording device.

9. The video image capture device according to claim 2, further comprising a monitor which displays images and a display circuit which controls display by the monitor, and wherein the display circuit, at the time of reproduction, causes the first corrected image data and the second corrected image data read in succession from the recording device, to be displayed in juxtaposition on the monitor.

10. The video image capture device according to claim 1, wherein the recording device stores, as image data corresponding to the first angle of view, the original image data of the first angle of view comprising the distortion, and stores, as image data corresponding to the second angle of view, second corrected image data corresponding to the second angle of view of the original image data output from the distortion correction circuit.

11. The video image capture device according to claim 10, further comprising a monitor which displays images and a display circuit which controls display by the monitor, and wherein the display circuit, at the time of image capture, causes the second corrected image data to be displayed on the monitor.

12. The video image capture device according to claim 10, further comprising a monitor which displays images and a display circuit which controls display by the monitor, and wherein the display circuit, at the time of image capture, causes first corrected image data corresponding to the first angle of view of the original image data and output from the distortion correction circuit, to be displayed on the monitor.

13. The video image capture device according to claim 12, wherein the display circuit causes a frame of the second angle of view to be displayed on the first corrected image data.

14. The video image capture device according to claim 10, further comprising a monitor which displays images and a display circuit which controls display by the monitor, and wherein the display circuit, at the time of image capture, causes the second corrected image data, and first corrected image data corresponding to the first angle of view of the original image data and output from the distortion correction circuit, to be displayed in juxtaposition on the monitor.

15. The video image capture device according to claim 10, further comprising a monitor which displays images and a display circuit which controls display by the monitor, and wherein the display circuit, at the time of reproduction, displays on the monitor the second corrected image data read in succession from the recording device and, at an arbitrary time, switches to display of first corrected image data corresponding to the first angle of view of the original image data which has been read from the recording device, corrected and output by the distortion correction circuit.

16. The video image capture device according to claim 10, further comprising a monitor which displays images and a display circuit which controls display by the monitor, and wherein the display circuit, at the time of reproduction, displays on the monitor first corrected image data corresponding to the first angle of view of the original image data which has been read in succession from the recording device, corrected and output by the distortion correction circuit and, at an arbitrary time, switches to display of the second corrected image data read in succession from the recording device.

17. The video image capture device according to claim 10, further comprising a monitor which displays images and a display circuit which controls display by the monitor, and wherein the display circuit, at the time of reproduction, displays on the monitor in juxtaposition, first corrected image data corresponding to the first angle of view of the original image data which has been read in succession from the recording device, corrected and output by the distortion correction circuit, and the second corrected image data.

18. The video image capture device according to claim 10, further comprising a monitor which displays images and a display circuit which controls display by the monitor, wherein, at the time of reproduction, the distortion correction circuit corrects distortion in original image data corresponding to a third angle of view set using the instruction portion and outputs as third corrected image data, and the display circuit causes the third corrected image data to be displayed on the monitor.

* * * * *